S. BROWN.
SPRING WHEEL.
APPLICATION FILED JUNE 17, 1913.
1,116,984.
Patented Nov. 10, 1914.
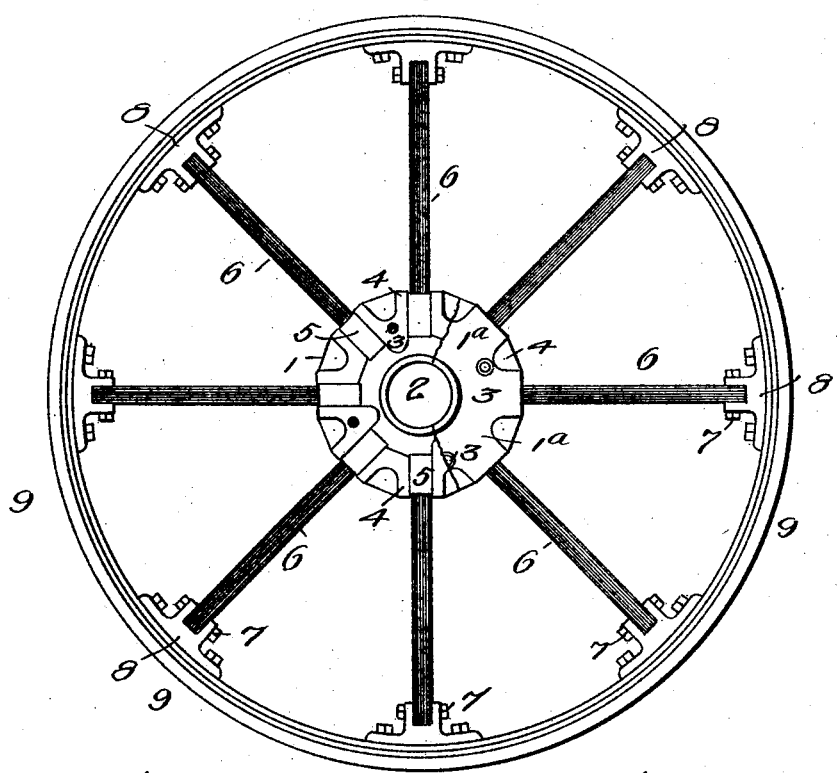
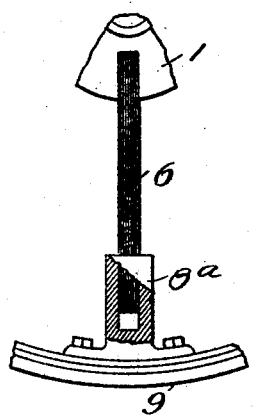
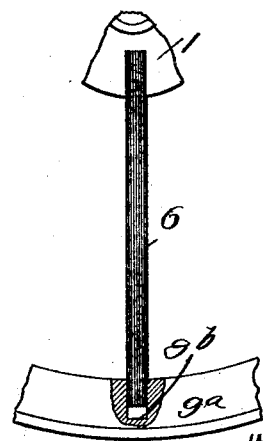
WITNESSES
INVENTOR
SUMMERS BROWN
BY
ATTORNEYS

UNITED STATES PATENT OFFICE.

SUMMERS BROWN, OF LONDON, ENGLAND.

SPRING-WHEEL.

1,116,984.   Specification of Letters Patent.   Patented Nov. 10, 1914.

Application filed June 17, 1913. Serial No. 774,132.

*To all whom it may concern:*

Be it known that I, SUMMERS BROWN, a subject of the King of England, and a resident of London, E. C., England, have invented an Improvement in Spring-Wheels, of which the following is a specification.

This invention relates to improvements in that type of resilient vehicle wheels in which resilient spokes are employed, and my object is to simplify the construction of such wheels by reducing the number of parts, lessening the friction of the moving parts, and increasing the elasticity of the wheel as a whole.

I employ resilient spokes composed of steel laminæ or leaf springs which are preferably secured to the rim and free to slide within the hub. Further, as a modification, the spokes may be secured to the hub and free to slide in shoes on the rim or within the rim itself. The free ends of the spokes are preferably provided with collars which engage with grooves or channels in the hub, or in the shoes on the rim, or within the rim itself.

In the accompanying drawing, Figure 1 is a face view of a wheel constructed according to my invention, the hub cover being broken away to show interior construction. Figs. 2 and 3 are detail, partly sectional, views showing modifications.

In Fig. 1, the circular hub 1 is provided with a central bore 2 to receive an axle (not shown). A face plate 1ª covers the hub and is secured by bolts or rivets 3. The peripheral portion of the hub has a series of V-shaped pieces 4 arranged radially and spaced apart, and the spaces between their straight parallel sides receive cuffs 5 which are applied to the inner ends of the laminated spring spokes 6. The outer ends of the latter are secured by bolts or rivets 7 in shoes 8 which are in turn bolted to the wheel rim 9. While the shoes are thus separate and detachable from the rim, they may be cast in one piece with the rim if desired. It will be seen that by this construction and arrangement of parts, the inner ends of the spokes are adapted to slide in the radial sockets provided in the hub, and that such movement occurs whenever a load is imposed on the wheel, and the spokes at the same time yield and bend laterally in the plane of the wheel according to the load and the obstructions encountered by the wheel in the road-bed. It is to be understood that either end of the spokes may be fastened or free, since the operation will be practically the same in both cases. Thus, in Fig. 2 the inner ends of the spokes are secured to the hub 1ᵇ, while their outer ends are adapted to slide in shoes 8ª having a long socket. In Fig. 3, the outer ends of the spokes are shown arranged to slide in sockets 8ᵇ formed in the solid wheel rim 9ª. Various other modifications may be effected without departing from the spirit of the invention; for example, the hub and shoes may take varying forms, and suitable linings or bushes may be utilized. Again, although I have described the hub as having V-shaped pieces cast or fitted upon its surfaces for forming channels for the sliding members, it will be understood that other means may be employed for producing the same result.

I have not described any particular material for the wheel rim, but wood or metal may be employed.

I claim:—

1. A spring wheel, comprising a hub having on its periphery a plurality of V-shaped pieces spaced apart to form sockets, and provided with a face plate secured to the hub over the said pieces, a rim provided with shoes, and laminated spring spokes having their outer ends secured to the shoes, the inner ends of the spokes being provided with cuffs and slidable in the said sockets.

2. A spring wheel, comprising a hub having a plurality of V-shaped pieces on its periphery said pieces being spaced apart to form sockets, a rim, and spring spokes having their outer ends secured to the rim and their inner ends slidable in the said sockets.

3. A spring wheel, comprising a hub having sockets in its periphery, a rim provided with shoes having sockets, and laminated spring spokes having cuffs on their inner ends and slidably mounted in the sockets of the hub, the outer ends of the spokes being fixedly secured in the sockets of the said shoes.

SUMMERS BROWN.

Witnesses:
 DOUGLAS BROWN,
 GEO. E. SUTTON.

Copies of this patent may be obtained for five cents each, by addressing the "Commissioner of Patents, Washington, D. C."